United States Patent [19]

Bartlett

[11] 4,240,611
[45] Dec. 23, 1980

[54] BELT TIGHTENING APPARATUS

[76] Inventor: Ronald D. Bartlett, c/o Metropolitan Water District, Earp, Calif. 92242

[21] Appl. No.: 937,330

[22] Filed: Aug. 28, 1978

[51] Int. Cl.³ .............................................. B66F 1/04
[52] U.S. Cl. ................................................... 254/237
[58] Field of Search ........................... 254/51, 55–56, 254/60–61, 71–72, 108–111; 81/3 K, 3 R; 29/239, 267, 244

[56] References Cited

U.S. PATENT DOCUMENTS

| | | | |
|---|---|---|---|
| 1,792,535 | 2/1931 | Greutman | 254/71 |
| 2,768,768 | 10/1956 | Cornell et al. | 254/110 |
| 3,144,707 | 8/1964 | Hiestand | 254/108 |
| 3,197,848 | 8/1965 | Eichacker | 254/108 |
| 3,325,095 | 6/1967 | Mueller et al. | 254/110 |
| 3,727,884 | 4/1973 | Custer | 254/100 |

*Primary Examiner*—Robert C. Watson
*Attorney, Agent, or Firm*—William C. Babcock

[57] ABSTRACT

The present disclosure sets out a belt tightening apparatus conformed by modifying a caulking gum fixture to include end fittings which are alternatively received in adjustment slots or which may be abutted against pulley wheels to tighten a pulley belt. More specifically a ratchet advancing mechanism useful with caulking cartridges is modified to include a transverse bar extending through the cartridge seat and projecting beyond the periphery thereof a free end of the ratcheting box be provided with either a cantelevered end fitting or with an end fitting adapted to receive a square drive. The other end of the ratchet handle may be similarly provided with a square fitting and the respective square fittings may be attached to arcuate brackets adapted for receipt in the groove of a pulley wheel. Thus the ratcheting action of a caulking gun may be used to advantage in tensioning pulley belts, the self-locking features thereof providing the further advantage of unattended operation.

2 Claims, 9 Drawing Figures

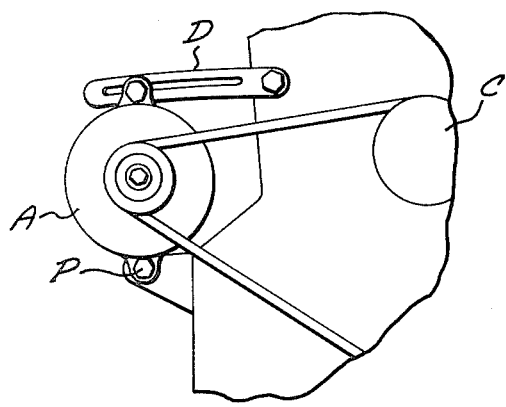
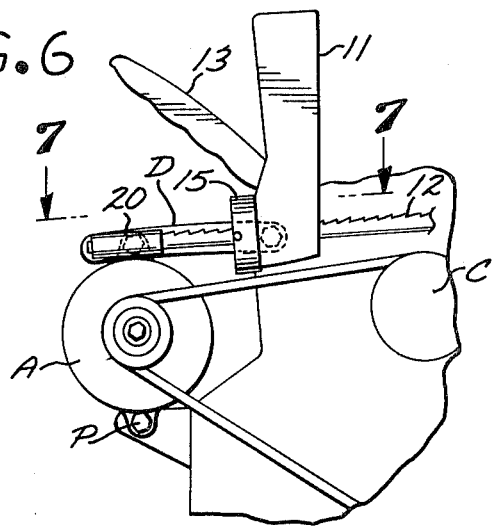
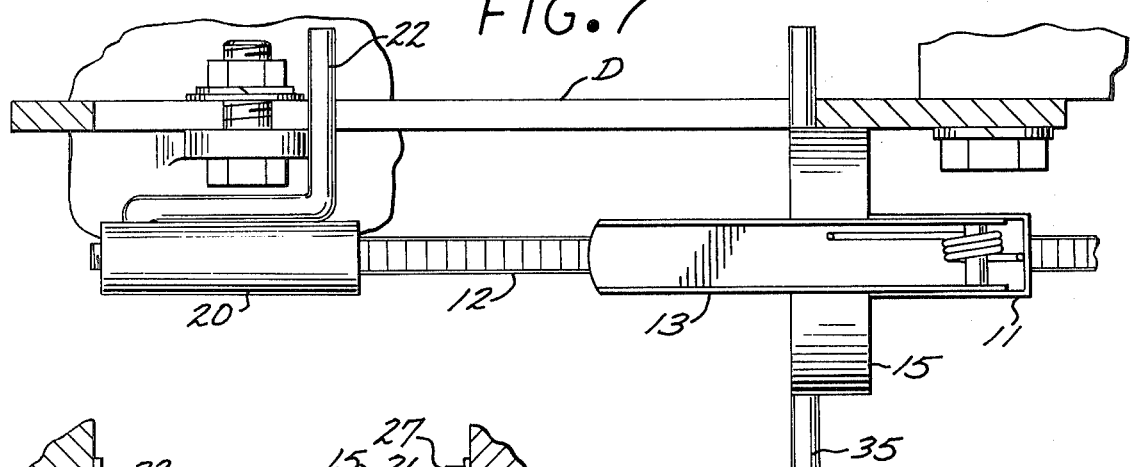
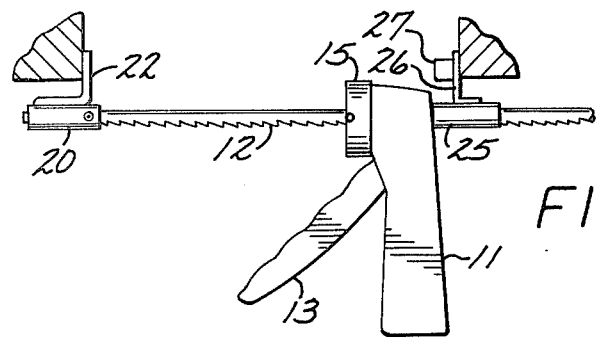
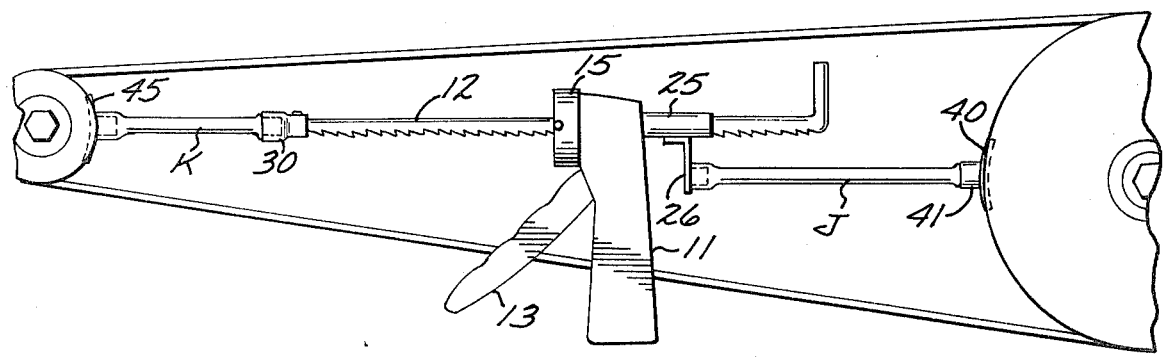

ns. Typically operations of this kind now involve assistance from other personnel, increasing the cost of the labor performed and complicating the procedure.
BELT TIGHTENING APPARATUS

BACKGROUND OF THE INVENTION

1. Field of the Invention

The present invention relates to belt tensioning devices, and more particularly to belt tensioning devices adapted to utilize caulking gun structures.

2. Description of the Prior Art

In many applications, the use of pulley belts has had extensive acceptance. Quite often, like in an automobile for example, certain necessary tension levels have to be achieved and set in between the various pulleys connected by the belt in order that maximum power is transmitted. As the automobile has become more complicated, the difficulty in stretching the pulley belt also increased. Most frequently items like the alternator or a hydraulic pump are pivotally translated to achieve the desired degree of tension. In order to allow for this pivotal freedom the alternators of the other devices are loosened in their mounts and tension therefor has to be applied constantly as the various fasteners are then tightened. Typically operations of this kind now involve assistance from other personnel, increasing the cost of the labor performed and complicating the procedure.

To provide for more convenience in this manual endeavor there have been various devices developed in the past which in one way or another assist in tensioning the belt. Most of such prior art devices however, are formed as separate tool structures with the attendant cost of manufacture and the attendant multiplication of tools stored by the user.

SUMMARY OF THE INVENTION

Accordingly, it is the general purpose and object of the present invention to provide a belt tensioning device formed by modification of a conventional caulking fixture which, by virtue of its modification, may be used either in an external or internal clamping configurations.

Other objects of the invention are to provide attachments to a caulking gun which can be selectively installed for adapting the use thereof in stretching pulley belts.

Yet further objects of the invention are to provide a belt stretching device utilizing the latching principles of a caulking gun handle to best advantage.

Briefly these and other objects are accomplished within the present invention by forming a tubular end cap adapted for insertion onto the end of the ratchet member of a caulking gun handle, the end cap being provided with manual securing means and a cantelevered bar extending radially therefrom. By further modification the cartridge base in the gun handle is modified to include yet another transverse bar, once more extending in cantelever, the end cap bar and the bar extending from the cartridge base being insertable into openings of the various movable members to thus apply a separating force therebetween and thereby stretching the pulley belt deployed. In further implementation the gun handle may further be provided with tubular sleeves deployed on the rear segment of the ratchet bar, the tubular sleeve including a cantelevered brace extending radially therefrom, the brace being provided with a square projection conformed to be received in various square fittings normally utilized in tools. In the configuration the cantelevered brace may either be used by itself as a separating member or may be rotated to receive an arcuate bracket on the rectangular projection thereof, the shape of the bracket being conformed for insertion into the groove of a pulley.

The foregoing structure may further include a substitute end cap, once more provided with a square opening for receiving a square mount formed on yet another arcuate bracket.

The use of square mounts may be complimented with the normal extensions found in the conventional socket drive tools to expand the range of utility of the aforementioned device. Thus a selection of fittings may be vended in kit form so that the user may then implement such in conjunction with the normally found caulking gun fixture.

BRIEF DESCRIPTION OF THE DRAWINGS

FIG. 5 is a front view of a typical pulley belt arrangement found in an automobile;

FIG. 6 is a front view, once more, of an automotive arrangement illustrating the use of the inventive device therein;

FIG. 7 is a top view taken along line 7—7 of FIG. 6;

FIG. 8 is a side view illustrating yet another useful arrangement of the tool disclosed herein; and FIG. 9 is yet another side view illustrating the device constructed according to the present invention as expanded by conventional drive extensions for stretching long pulley belts.

DESCRIPTION OF THE PREFERRED EMBODIMENT

Figure 1:
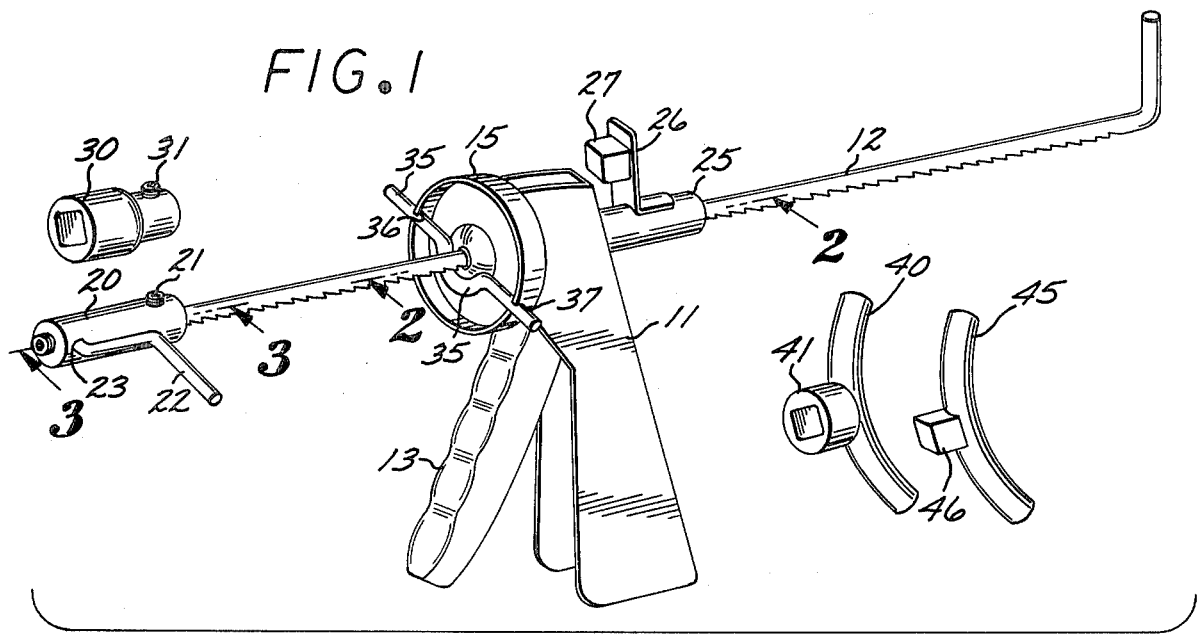
FIG. 1 is a perspective view, separated by parts, of a pulley belt tensioning device constructed according to the present invention.

As shown in FIG. 1 the inventive belt stretching device, generally designated by the numeral 10, utilizes a conventional caulking gun handle assembly 11 which amongst its parts includes a ratchet bar 12 advanced by a pivoted lever 13. In its normal form, handle assembly 11 also includes a dish cartridge cap 15 normally insertable into the interior of a caulking cartridge to advance the caulking compound out of the end thereof. In the conventional form bar 12 is bent over on the rear end thereof and extends as a straight projection over the forward section thereof. Mounted on the end of the forward section of bar 12 is a tubular end fitting 20. It is this end fitting that comprises one element of the modifications disclosed herein for adapting the foregoing handle assembly 11 to a use in stretching pulley belts. Deployed over the rear segment of bar 12 and abutting the rear surface of handle assembly 11 is a sleeve 25 slidably translated over the bar, sleeve 25 being provided with a cantelevered brace 26 extending radially therefrom, brace 26 being formed to include a square male socket fitting 27 of conventional configuration. Similarly fitting 20 is provided with a radially directed set screw 21 to engage the exterior surface of bar 12 and a V-shaped cylindrical metal rod 22 extending from a transverse opening 23 and aligned next to the end fitting 20 to project in cantelever therefrom. It is to be understood that the end fitting 20 and the sleeve 25 comprise parts of the modification disposed herein. As an alternative, fitting 20 may be replaced by a female square square drive socket 30 once more insertable onto the ends of bar 12 and secured thereto by a set screw 31. Female socket 30, in conventional form, includes the necessary square female socket for receiving standard size male fittings on the interior thereof. To complete the foregoing implentation cap 15 includes a transverse, convolved bar 35 extending radially thereacross, bar 35 being aligned to pass through two diametrically opposed openings 36 and 37 formed in the side walls of the cap. Bar 35 extends beyond the radial dimensions of cap 15, to provide once more, cantelevered extensions useful in tightening belts according to the description following. The foregoing structure may be further expanded for varied use by two arcuate end brackets 40 and 45, bracket 40 including a female socket 41 on the exterior of the arc thereof, and bracket 45 including a male socket 46, again on the exterior thereof. These same brackets 40 and 45 may be mounted onto the aforementioned male fitting 27 or the end socket 30 providing the necessary surface for insertion into the groove of a pulley wheel, thus allowing the application of force thereto.

Figure 2:
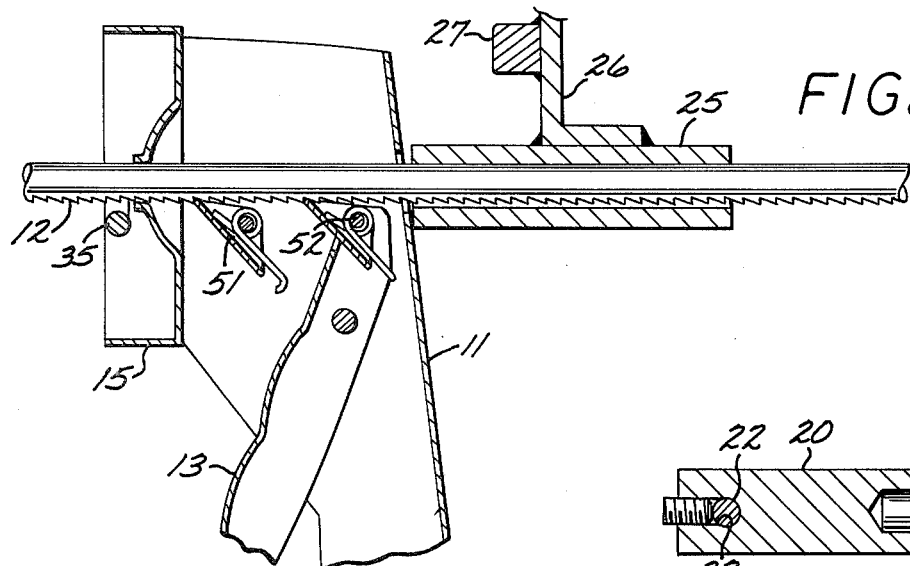
FIG. 2 is a sectional view taken on the line 2—2 of FIG. 1.
Figure 3:
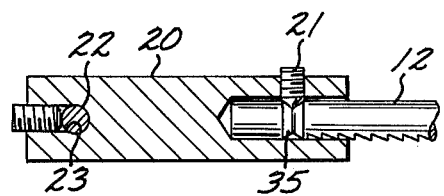
FIG. 3 is yet another sectional view taken on the line 3—3 of FIG. 1.
Figure 4:
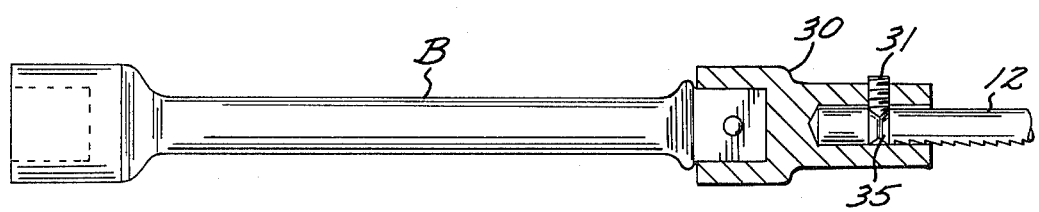
FIG. 4 is detailed view illustrating the expansion of the device disclosed herein by use of conventionally found devices.

As shown in FIG. 2, the conventional arrangement of the ratchet bar 12 in the handle assembly 11 includes the requisite latching detent 51 and the advancing detent 52 supported on the end of the lever 13. Thus as lever 13 is articulated the advancing detent 52, spring loaded to engage the ratchet serrations on bar 12, advances the bar towards the front of the handle assembly while the latching detent 51 maintains it thereat. In this form the aforementioned sleeve 25 is mounted on the rear segment of the ratchet bar, providing a cantelevered offset relative the center axis thereof for deploying the aforementioned tools or for engaging various opposing structures through which the belt is stretched. As shown in FIG. 3 the forward end or bar 12 may be modified to include a circumferential groove 55 in which the set screw 21 is received. It is to be understood that the same groove 55 may be utilized to receive the set screw 31 engaged in the end socket 30. More specifically as shown in FIG. 4 end socket 30 may be used in conjunction with a conventional socket extension bar B thus extending the dimension of the device to accommodate various belt lengths.

The foregoing assemblage of parts may be utilized in various installations according to the example set forth in FIGS. 5–9. More specifically, shown in FIG. 5 the conventional arrangement of an automobile includes the deployment of a generator or alternator A from a bracket pivot P and secured in relative alignment with respect to a drive pulley C by engaging a slotted bar D.

As shown in FIGS. 6 and 7 the separation of the alternator A relative the pulley C may be expanded by inserting the cantelevered bar 22 into the interior of the slotted bar D, the transverse bar 35 being received in the other end of the slot. Thus as the ratchet bar 12 is advanced the separation between bars 22 and 35 is increased, separating the alternator attachment from the engine structure.

As shown in FIG. 8 the same assemblage of parts may be utilized to separate other objects, more specifically the surface of the cantelevered brace 26 engaging one opposed structure while the cantelevered bar 22 engaging the other. In further adaptation, the aforementioned socket fitting 30 may be substituted for the end fitting 20, according to the structure shown in FIG. 9. More specifically shown inserted into the socket fitting 30 is yet another extension K having received in the free and thereof the aforementioned arcuate bracket 35. Similarly extending in the opposite direction from the square male fitting 27 is an extension J supporting on the free end thereof the aforementioned acruate bracket 40. In this form brackets 40 and 45 may be inserted into the opposed groove areas of two pulleys connected by a pulley belt, providing the necessary belt tensioning. It should be understood that by proper selection and use of extension bar K and J almost any dimensional separation between two ends may be accommodated.

What is claimed is:

1. In a ratchet advanced caulking gun handle assembly having a ratchet bar extending therethrough and a lever for advancing said ratchet bar relative said handle assembly the improvement comprising:
   a first end fitting adapted to be secured to one end of said ratchet bar including a first cantelevered projection extending laterally therefrom;
   an opposing support engaged to abut said handle assembly and including a second cantelevered projection extending laterally therefrom said first and second projections being conformed for insertion between adjacent pulleys connected by a pulley belt.

2. In a ratchet advanced caulking gun handle assembly having a ratchet bar extending therethrough and a lever for advancing said ratchet bar relative said handle assembly the improvement comprising: p1 a end fitting conformed as a first cantelevered projection adapted to be secured to one end of said ratchet bar;
   an opposing support engaged to abut said handle assembly and including a second cantelevered projection extending laterally therefrom; said first end fitting and said second cantelevered projection including square sockets arranged for opposing alignment and arcuate brackets adapted to be mounted in said sockets.

* * * * *